United States Patent
Berkey

(10) Patent No.: US 6,422,042 B1
(45) Date of Patent: *Jul. 23, 2002

(54) RIT METHOD OF MAKING OPTICAL FIBER HAVING DEPRESSED INDEX CORE REGION

(75) Inventor: George F. Berkey, Pine City, NY (US)

(73) Assignee: Corning Incorporated, Corning, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/256,248

(22) Filed: Feb. 23, 1999

Related U.S. Application Data

(63) Continuation of application No. 08/795,687, filed on Feb. 5, 1997, now Pat. No. 5,917,109, which is a continuation-in-part of application No. 08/359,392, filed on Dec. 20, 1994, now abandoned.

(51) Int. Cl.$^7$ .............................................. C03B 37/027
(52) U.S. Cl. .............................. 65/397; 65/412; 65/421
(58) Field of Search .......................... 65/412, 397, 421, 65/422

(56) References Cited

U.S. PATENT DOCUMENTS

| | | | |
|---|---|---|---|
| 4,486,212 A | | 12/1984 | Berkey |
| 4,648,491 A | | 3/1987 | Taylor |
| 4,648,891 A | | 3/1987 | Abe |
| 4,659,355 A | * | 4/1987 | Maze |
| 4,668,263 A | | 5/1987 | Yokota et al. |
| 4,675,040 A | | 6/1987 | Tanaka et al. |
| 4,812,153 A | | 3/1989 | Anderjco et al. |
| 4,822,136 A | * | 4/1989 | Hicks |

(List continued on next page.)

FOREIGN PATENT DOCUMENTS

| | | |
|---|---|---|
| AU | 38145/85 | 1/1985 |
| EP | 0050142 | 1/1982 |
| EP | 147225 | 7/1985 |
| EP | 0176263 | 4/1986 |
| EP | 0182250 | 5/1986 |
| EP | 0300610 | 6/1989 |
| EP | 0 139 348 B1 | 1/1990 |
| EP | 0139348 | 1/1990 |
| EP | 0359351 | 3/1990 |
| EP | 0501429 | 4/1992 |
| EP | 0484659 | 5/1992 |
| EP | 0522229 | 1/1993 |
| EP | 0718244 | 1/1996 |
| GB | 2038311 | 7/1980 |
| JP | 01-160838 A | 6/1989 |
| WO | WO9302018 | 2/1993 |

OTHER PUBLICATIONS

English Translation of Abstract of JP APP. 62–226829; Publication date May 10, 1987; Kunio et al.
English Translation of Abstract of JP APP. 01–160838; Publication date Jun. 23, 1989; Gotaro.
English Translation of Abstract JP APP. 01–153551; Publication date Jun. 15, 1989; Hiroshi et al.
English Translation of Abstract of JP APP. 02–180727; Publication date Jul. 13, 1990; Makoto.

*Primary Examiner*—John Hoffmann
(74) *Attorney, Agent, or Firm*—Timothy R. Krogh; Robert L. Carlson

(57) ABSTRACT

Disclosed is a method of making an optical fiber preform having at least one annular region of depressed refractive index. A tube of silica doped with fluorine and/or boron is overclad with silica soot. A core rod is inserted into the overclad tube and the resultant assembly is heated while chlorine flows between the tube and the core rod to clean the adjacent surfaces. When the soot sinters, the tube collapses onto and fuses to the rod. The resultant tubular structure is formed into an optical fiber which exhibits low attenuation as a result of the low seed count at the interface between the inner core and the region that is doped with florine and/or boron.

30 Claims, 7 Drawing Sheets

U.S. PATENT DOCUMENTS

| | | |
|---|---|---|
| 4,846,867 A | 7/1989 | Yokota et al. |
| 4,979,971 A | 12/1990 | Kyoto et al. |
| 5,022,904 A | 6/1991 | Ishiguro et al. |
| 5,055,121 A * | 10/1991 | Kanamori ................ 65/426 |
| 5,090,980 A | 2/1992 | Clasen |
| 5,149,349 A * | 9/1992 | Berkey |
| 5,158,587 A | 10/1992 | Kyoto et al. |
| 5,203,898 A | 4/1993 | Carpenter et al. |
| 5,221,309 A | 6/1993 | Kyoto et al. |

* cited by examiner

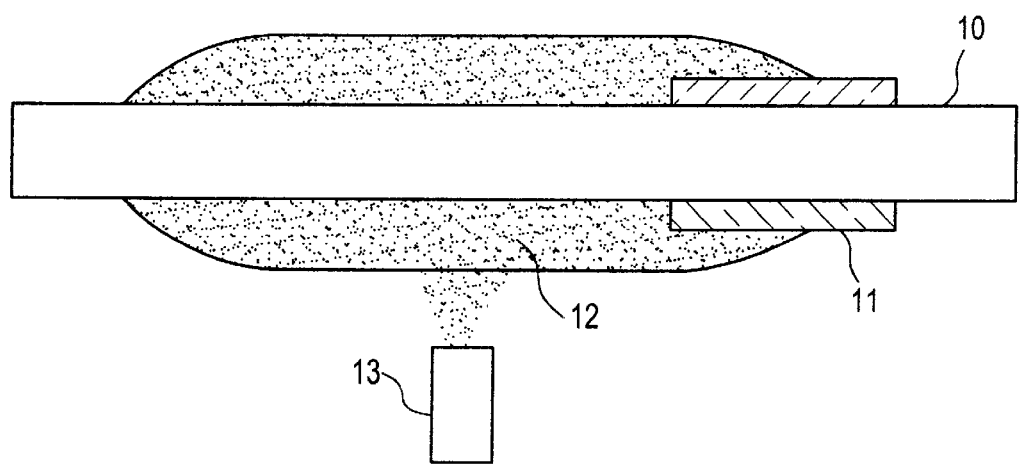
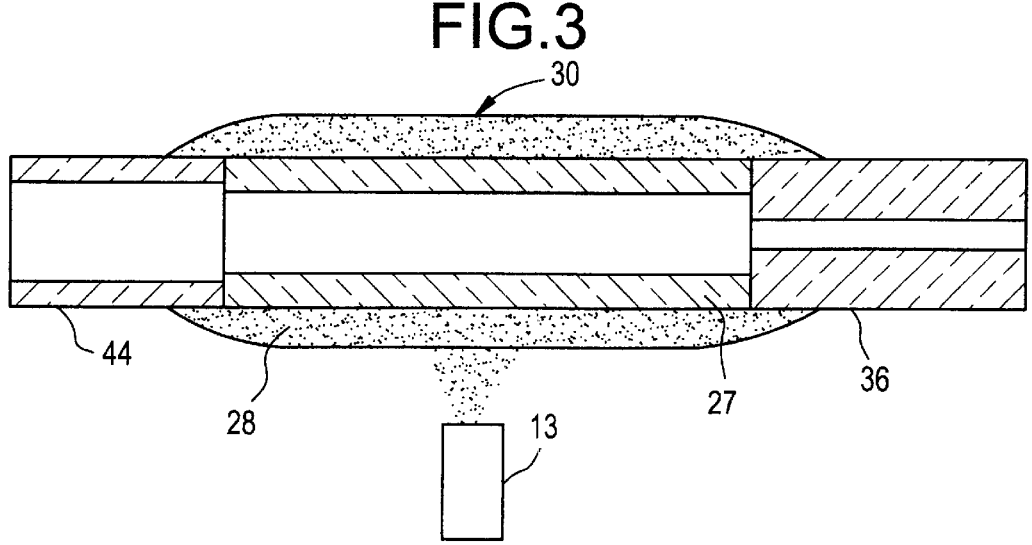

RIT METHOD OF MAKING OPTICAL FIBER HAVING DEPRESSED INDEX CORE REGION

CROSS-REFERENCE TO RELATED APPLICATIONS

This is a continuation of Ser. No. 08/795,687, Feb. 5, 1997, now U.S. Pat. No. 5,917,109 which is a continuation-in-part of U.S. patent application Ser. No. 08/359,392 filed Dec. 20, 1994 now abandoned.

BACKGROUND OF THE INVENTION

This invention relates to a method of making a glass article by fusing a rod and tube such that substantially no seeds are formed at the interface between them. The method of this invention is useful for making low loss optical fibers, especially those fibers in which the core includes an annular region of depressed refractive index relative to silica.

Optical fibers having refractive index profiles such as W-profiles, segmented core profiles, and the like possess desirable dispersion characteristics. See U.S. Pat. Nos. 4,715,679 and 5,031,131 for teachings of various kinds of dispersion modified optical fibers. Fibers having these kinds of refractive index profiles have often been made by chemical vapor deposition (CVD) processes such as plasma CVD processes that are capable of forming single-mode fibers the cores of which include layers of different refractive indices (see FIGS. 7 and 8, for example). Such processes produce relatively small preforms. It is advantageous to form dispersion modified optical fiber preforms by outside vapor deposition (OVD) processes which produce relatively large preforms or draw blanks in order to decrease the cost of making the fiber.

A typical OVD process for forming such fibers is disclosed in U.S. Pat. No. 4,629,485. In accordance with that patent, a germania-doped silica rod is formed and stretched to decrease its diameter. A piece of the rod is used as a mandrel upon which pure silica glass particles or soot is deposited. The resultant composite structure is heated in a consolidation (drying and sintering) furnace through which a fluorine-containing gas flows. The soot is therefore doped with fluorine and sinters on the rod. One or more additional layers of glass are formed on the outer surface of the fluorine-doped silica layer to form a blank from which a fiber can be drawn.

When soot is sintered in accordance with the aforementioned method, whereby fluorine is supplied to the porous preform solely by way of the fluorine-containing muffle gas, the fluorine concentration (as measured by the Δ of the fluorine-containing layer) is not sufficient to provide certain desirable optical characteristics. The typical fluorine concentration acheived with muffle gas doping provides a −0.4%Δ when $SiF_4$ is the fluorine-containing constituent. The maximum delta value for $SiF_4$ produced by the above-described process is −0.5%Δ.

One aspect of the invention concerns a method of making an optical fiber preform an annular region of which consists of silica doped with a sufficient amount of fluorine that the delta value of the annular region with respect to silica is more negative than −0.5%Δ.

As used herein, the term $\Delta_{a-b}$, the relative refractive index difference between two materials with refractive indices $n_a$ and $n_b$, is defined as $$\Delta_{a-b}=(n_a^2-n_b^2)/(2n_a^2) \qquad (1)$$

For simplicity of expression, Δ is often expressed in percent, i.e. one hundred times Δ. In this discussion, $n_a$ is the refractive index of the fluorine-doped glass and $n_b$ is the refractive index of silica.

Another aspect of the invention concerns the collapse of a tube of fluorine-doped and/or boron-doped glass onto a rod of core glass such that during the resultant fusion of the interface between those two members, substantially no seeds are formed.

When a fluorine-doped silica tube is collapsed onto a germania-doped silica rod, the resultant interface between those two members has heretofore contained many seeds, and much of the resultant preform or blank produces unusable optical fiber. Such seed formation is less prevalent when members formed of other glass compositions such as a germania-doped silica rod and a pure silica tube are fused to form a preform.

U.S. Pat. No. 4,668,263 discloses a method for collapsing a silica tube having a fluorine-doped inner layer onto the surface of a silica rod. In accordance with that patent the collapse step is accomplished by rotating the tube and heating it with the flame from a longitudinally travelling burner. That technique could not be employed to make dispersion modified fiber designs of the type that utilize the entire fluorine-doped tube, including the outer surface, as part of the core region or light propagating region of the fiber. The reason for this is that, since the flame wets the glass, i.e. introduces hydroxyl contamination, the resultant fiber would be rendered unsuitable for operation at wavelengths where attenuation due to hydroxyl ions is large. A further disadvantage of this method concerns the temperature of the flame, which is not lower than 1900° C. At such high temperatures, control of the process becomes difficult. The axis of the preform can become non-linear or bowed. If the core rod is a soft glass such as a germania-doped glass, the rod can become softer than the tube; this can result in an out-of-round core or a core that is not concentric with the outer surface of the resultant fiber.

U.S. Pat. No. 4,846,867 discloses a method for collapsing a fluorine-doped silica tube onto the surface of a silica rod. Prior to the tube collapse step, a gas phase etchant is flowed through the gap between the rod and tube while the tube is heated by a flame. In the specific examples, wherein $SF_4$ is the etchant, a gaseous mixture of $SF_4$, $Cl_2$ and oxygen (ratio 1:1:6 by volume) is introduced through a gap between the rod and the tube. Such a gaseous mixture removes glass from the treated surfaces of the rod and tube, thus forming new surfaces at the rod/tube interface. The chlorine is present in an amount sufficient to remove water generated by the fluorine-containing etchant. The outer surface of the resultant preform is thereafter coated with silica soot particles that are dried, doped with fluorine and then sintered to form a blank from which an optical fiber is drawn. The flame that was directed onto the tube during the gas phase etching step introduces water into the outer surface of the tube. The attenuation of the fiber resulting from that water is high. The attenuation at 1380 nm for one example is 30 dB/km which is attributed to contact of the oxyhydrogen flame with the preform.

SUMMARY OF THE INVENTION

An object of the invention is to provide a method of joining first and second adjacent layers of a glass preform such that the interface therebetween is substantially seed-free. A further object is to provide an improved method of joining a core region to an adjacent region in a glass preform. Another object is to provide a method of making a rod-in-tube preform by the step of cleaning the adjacent surfaces of the rod and tube in such a manner that the outer surface of the tube does not become contaminated with water. Yet another object is to provide a method of forming a seed-free interface between a rod and tube in an optical fiber preform without removing glass from the adjacent surfaces of the rod and tube. Yet another object is to provide a method of making fluorine-doped silica glass having high negative delta by the OVD technique.

The present invention relates to a method of making a glass article. The method comprises inserting a non-porous glass core rod into a non-porous glass tube to form an assembly that is inserted into a furnace. While the entire assembly is being heated, a centerline chlorine-containing gas is flowed into the first end of the tube and between the tube and the rod, and out of the second end of the tube. Thereafter, the tube is collapsed onto the rod to form an assembly which can be formed into the glass article such as an optical fiber. The tube collapse step can be performed in the same furnace in which the chlorine cleaning step occurs.

As the adjacent surfaces of the rod and tube are cleaned by the centerline gas while the assembly is in a furnace, the outer surface of the tube is not contaminated by water that would be present if a flame were employed for heating the assembly during the cleaning step.

This method is especially suitable for forming an optical fiber having a core that includes an annular region of depressed refractive index.

The tube can be formed of silica doped with fluorine or boron, both of which can be added to silica to lower its refractive index. Fluorine is the preferred dopant since attenuation due to $B_2O_3$ limits fiber usage to wavelengths less than about 1200 nm.

To provide a tube doped with fluorine, a fluorine-containing gas is flowed into the aperture and outwardly through the pores of a porous, cylindrically-shaped glass preform. The porous glass preform is heated to sinter it into a non-porous fluorine-doped tube.

A further aspect of the invention concerns a method of making a glass article having an annular region containing a high content of fluorine. A tubular porous glass preform is initially formed. The preform is heated, and a centerline gas is flowed into the longitudinal aperture of the preform and outwardly through its pores. The centerline gas consists entirely of a fluorine-containing compound, whereby a high concentration of fluorine becomes incorporated in the pores of the preform. The porous preform is heated to sinter it into a non-porous fluorine-containing glass tube. A cylindrically-shaped core rod is inserted into the fluorine-doped tube. The tube is then shrunk onto the core rod, and the interface between the core preform and the tube is fused. An article such as an optical fiber can be formed from the resultant preform.

BRIEF DESCRIPTION OF THE DRAWINGS

FIG. 1 illustrates the formation of a porous glass preform on a mandrel.

FIG. 3 illustrates the application of a coating of glass particles to a fluorine-doped glass tube.

DESCRIPTION OF THE PREFERRED EMBODIMENT

The method of this invention can be employed to produce an optical fiber preform having at least one annular region containing a refractive index decreasing dopant. Basically, this method comprises (a) making a solid, non-porous glass tube containing a refractive index decreasing dopant throughout its entire radius, (b) inserting a solid, non-porous core glass rod into the tube, (c) cleaning the adjacent surfaces of the rod and tube by flowing a gas containing at least 50 volume percent chlorine between the rod and tube at an elevated temperature of at no more than 1600° C., (d) collapsing the tube onto the rod, and (e) adding to the resultant structure a sufficient amount of cladding to form a glass article from which an optical fiber is drawn. The core of the resultant fiber includes the inner core region and the depressed index region and optionally includes other adjacent annular regions.

Steps (a) through (e) are not necessarily performed in the stated order. In one embodiment, the tube is overclad with a soot coating, and steps (c) and (d) are performed in the same furnace, the overclad preform initially being subjected to a temperature sufficient to achieve the chlorine cleaning, the temperature then being increased to sinter the soot and collapse and fuse the tube to the rod.

Fiber attenuation is low as a result of the low seed count at the interface between the inner core and the depressed index region resulting from step (c). Fiber attenuation at the water peak of about 1380 nm is low since the tube is not heated by a flame in steps (c) and (d). Fibers produced by the method of this invention exhibit about 1 dB/km excess loss at 1380 nm. The Rayleigh scattering loss at 1380 nm depends on the core/clad delta. If, for example, a fiber has a Rayleigh scattering loss of about 0.4–0.5 dB/km at 1380 nm; its loss is about 1.5 dB/km at 1380 nm after the water peak is added.

Figure 2:
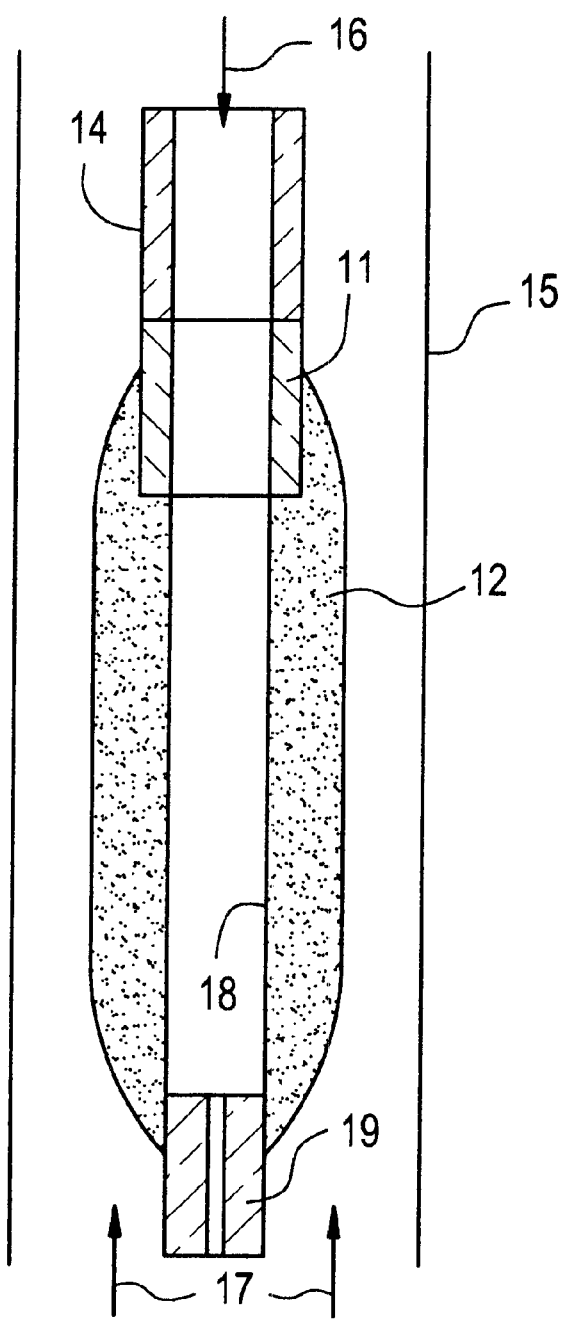
FIG. 2 illustrates the sintering of a porous glass preform.

In one embodiment of the invention, the annular preform region of depressed refractive index is doped with fluorine. FIGS. 1 and 2 illustrate a method of making a fluorine-doped glass tube. Mandrel 10 is inserted through tubular handle 11. Mandrel 10 has a relatively large diameter in order to produce a tube having a sufficiently large inner diameter to be useful in later steps of the method. While mandrel 10 rotates, it also undergoes translational motion with respect to soot generating burner 13, whereby a porous glass preform 12 is built up on the mandrel.

A standard ball joint handle 14 (see handle 44 of FIG. 3 for greater detail) is fused to handle 11, and preform 12 is suspended in consolidation furnace 15 by that handle. Sintering is performed in an atmosphere that includes a fluorine-containing centerline gas such as $SiF_4$, $CF_4$, $C_2F_6$, or the like. $SiF_4$ tends to give higher levels of fluorine doping (typically producing a −0.7%Δ and occasionally producing a delta of about −0.8%), but that dopant causes elevated water levels in the resultant glass. Such elevated water levels in the fluorine-containing glass can be tolerated if the fiber core has a relatively high Δ-value with respect to the silica cladding, whereby little power propagates in the annular fluorine-containing region of the fiber. $CF_4$ results in dryer glass but does not give the high dopant levels that can be obtained by using $SiF_4$. High concentrations of fluorine can be used in this process because porous soot preform 12 is formed of pure silica, i.e. there is no dopant such as germania that could be disadvantageously diffused within the blank. The resultant sinterd tube contains a relatively high fluorine concentration since fluorine-containing gas is flowed into the tube aperture 18 (arrow 16) and outwardly through the pores of the porous glass preform whereby it achieves maximum contact with the entire body of porous glass, and since the centerline gas can consist of a pure gaseous fluorine compound that contains no diluent such as helium, chlorine or the like. Also, the only dopant introduced into the porous preform by the centerline flow is fluorine. The end of the porous preform that sinters first preferably contains a capillary tube 19 to prevent the muffle gases from entering the preform aperture and to cause most of the centerline gas to flow outwardly through the preform interstices. A fluorine-containing gas also flows through furnace muffle 15, as indicated by arrows 17. Whereas the muffle gas 17 preferably contains a diluent gas such as helium and a sufficient amount of chlorine to dry the preform, the centerflow gas 16 preferably consists solely of the gaseous fluorine compound. However, the centerflow gas 16 could also contain one or more diluent gases such as helium and chlorine. The flow of chlorine can be discontinued after the desired water content has been achieved and before the porous preform sinters. Tube 19 is severed from the resultant fluorine-doped tube. The resultant fluorine-doped tube can be stretched or redrawn to decrease the inside diameter to the desired size. If the tube is stretched, it can then be cut to lengths suitable for the deposition of soot thereon.

A boron-doped tube 27 is simpler to make than a fluorine-doped tube. For example, a porous $SiO_2$—$B_2O_3$ preform could be formed on a mandrel as described in conjunction with FIG. 1, $BCl_3$ being fed to the burner along with $SiCl_4$. The mandrel is removed, leaving a longitudinal aperture, and the preform is placed into a consolidation furnace. A muffle gas of 40 standard liters per minute (slpm) helium flows upwardly through the furnace muffle, and centerline gases of 1 slpm helium and 75 standard cubic centimeters per minute (sccm) chlorine flows into the aperture. After the preform is dried, it is sinterd. The resultant tube can be stretched as described above.

As shown in FIG. 3, a standard ground joint handle 44 (see FIG. 4 for greater detail) is fused to one end of a length 27 of the fluorine-doped or boron-doped tube 27. A short length of silica tube 36 is preferably fused to the opposite end of tube 27. Tube 27 is then mounted in a lathe where it is rotated and translated with respect to soot generating burner 13. Particles of glass soot are deposited on tube 27 to build up coating 28. Silica tubing 36 is employed for the purpose of reducing fluorine tubing waste that would have been caused by the inability to deposit soot coating 28 on the end of tube 27 if it had been secured by the lathe chuck.

Coating 28 extends over that portion of handle 44 adjacent tube 27 for the following reason. During the subsequent sintering process, when that portion of tube 27 adjacent handle 44 is subjected to sintering temperature, its viscosity becomes sufficiently low that, if that portion of tube 27 were uncoated, it could not support the weight of the soot coated tube, i.e. the structure would drop into the consolidation furnace. However, since the soot extends over the adjacent part of handle 44, the entire end of tube 27 adjacent handle 44 is covered. Therefore, the silica soot forms a sufficiently strong layer over tube 27 to support the structure during the sintering process.

Whereas a single coating 28 is shown, a plurality of soot coatings could be deposited, the refractive index of each coating depending upon the desired refractive index profile of the resultant optical fiber. To form the refractive index profile between radii $r_1$ and $r_2$ of FIG. 7, soot coating 28 could consist of pure $SiO_2$. To form the profile between radii $r_1$ and $r_3$ of FIG. 8, a first soot coating of $GeO_2$-doped $SiO_2$ could be deposited on tube 27 followed by a second soot coating comprising pure $SiO_2$.

Figure 4:
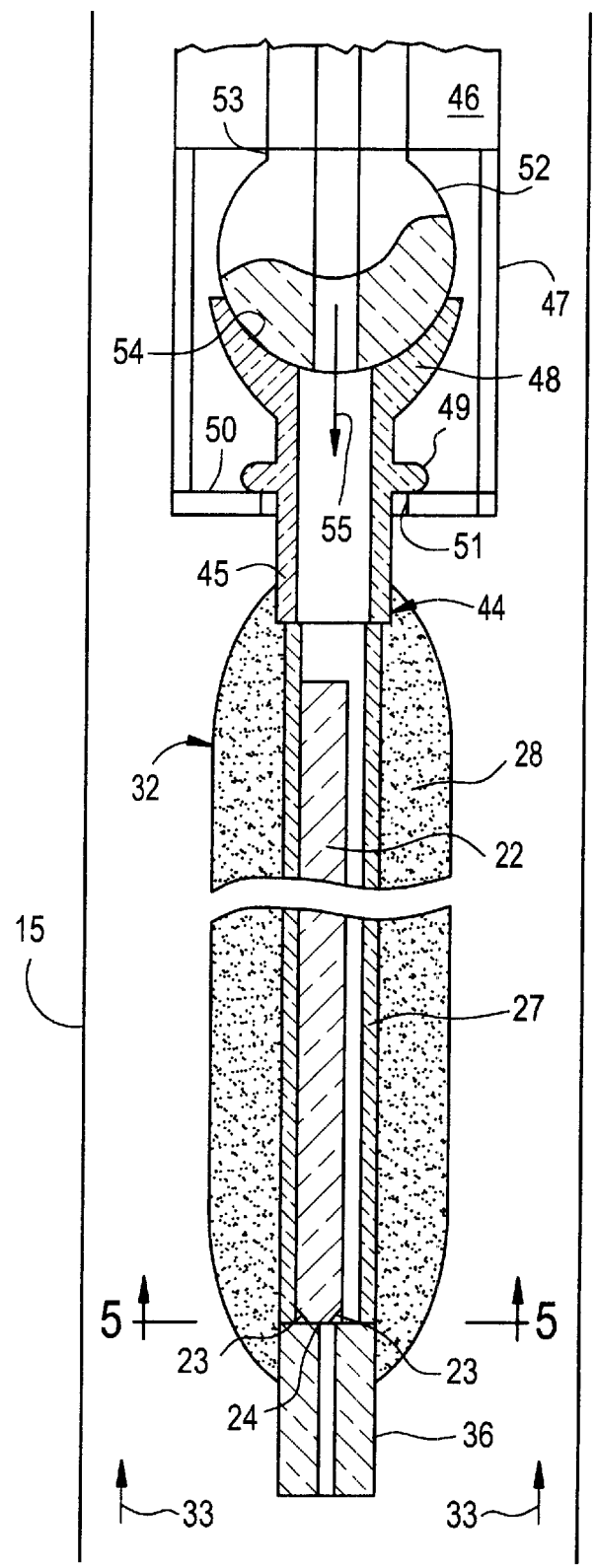
FIG. 4 as a cross-sectional-view of an apparatus for consolidating and fusing the assembly formed by the method of FIG. 3.
Figure 7:
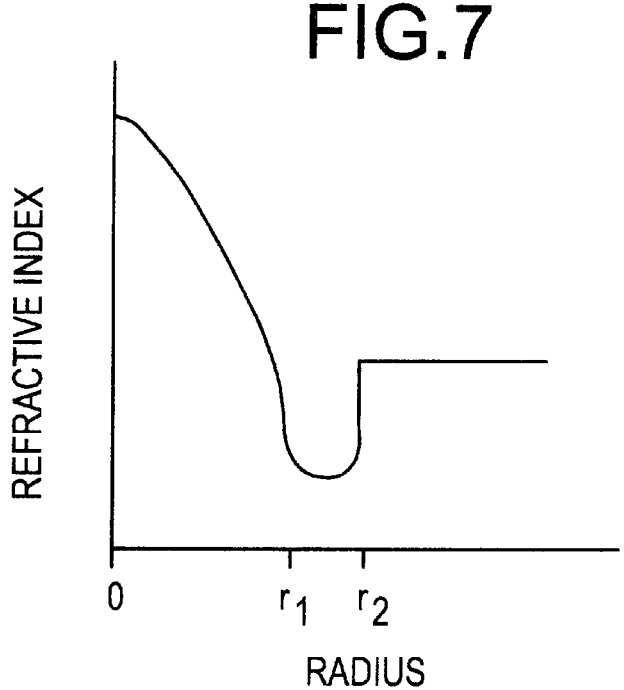
FIGS. 7 and 8 are exemplary of the refractive index profiles of optical fibers that can be produced by the method of this invention.
Figure 8:
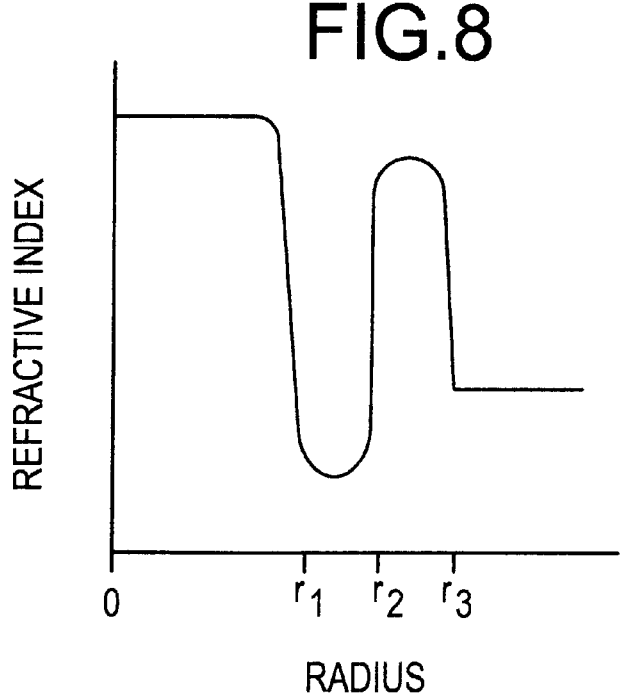

Referring to FIG. 4, the soot-coated tube is removed from the lathe, and a solid glass core rod 22 is inserted through handle 44 and into tube 27 to form assembly 32. Rod 22 cannot fall beyond tube 36 since that tube has a relatively small bore. If tube 36 were not employed, tube 27 could be heated and tapered inwardly to form a region of small enough inner diameter to retain rod 22. Alternatively, a small deformation or enlargement could be made to the top end of rod 22 to cause it to be retained by the top of tube 27. Rod 22 is preferably formed of a glass having a refractive index greater than that of tube 27, e.g. pure silica or silica doped with $GeO_2$, $P_2O_5$ or the like. Rod 22 can be formed by any one of various known techniques such as modified chemical vapor deposition (MCVD), vapor axial deposition (VAD) and outside vapor deposition (OVD), depending upon its desired refractive index profile. Two of the profiles that can be produced by the OVD technique are the central regions within radius $r_1$ of FIGS. 7 and 8. The central region of FIG. 7 is a radially decreasing one while that of FIG. 8 is a substantially step-profile. To make optical fibers having various types of optical characteristics, such as a specific dispersion modified characteristic, the central portion of the fiber may have a different refractive index profile such as parabolic gradient or the like. Any additional layers of radius greater than that of the fluorine-doped tube also affect optical properties such as dispersion.

Handle 44 is suspended from a support tube 46 for insertion into consolidation furnace 15. Handle 44 comprises glass tube 45 having a flared joint 48 at its upper end and an annular enlargement 49 spaced from the joint 48. Support tube 46 has a slotted handle formed in the end thereof. One side of end region 47 of tube 46 is removed to accept the upper end of handle 44, enlargement 49 resting on slotted base 50 as the adjacent section of tube 45 is inserted into slot 51. At the end of gas conducting tube 53 is a ball joint 52 which fits into cavity 54 of joint 48.

While assembly 32 is heated in consolidation furnace 15, a drying gas flows upwardly through the furnace (arrows 33). The drying gas conventionally comprises a mixture of chlorine and an inert gas such as helium. A chlorine-containing gas stream (arrow 55) is flowed from tube 53 into tube 27. Although gas stream 55 could contain a diluent such as helium, 100% chlorine is preferred for cleaning purposes. The gas streams consist of dry gases, whereby no water is present in the vicinity of assembly 32 during heat treatment. Gases can be purchased dry; moreover, the helium used for the muffle gas is also run through a drier.

Figure 5:
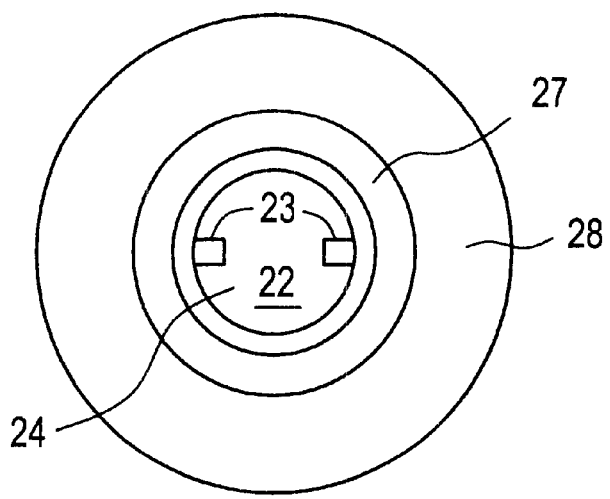
FIG. 5 is a cross-sectional view taken along lines 5—5 of FIG. 4.
Figure 10:
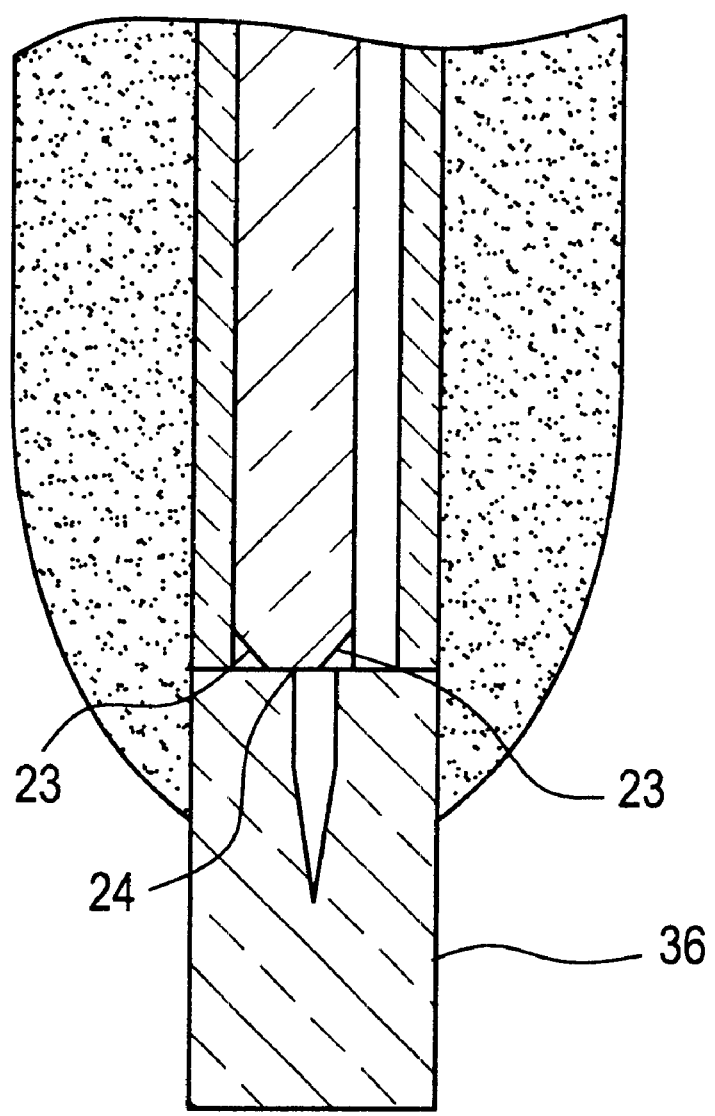
FIG. 10 is a cross-sectional view illustrating the closing of tube 36.

Since the diameter of rod 22 is slightly smaller than the inner diameter of tube 27, the chlorine flows downwardly around the entire periphery of rod 22; it exhausts through tube 36. To facilitate the flow of chlorine past the bottom end of rod 22, that end can be provided with one or more slots 23 at the periphery of the bottom surface (FIGS. 4 and 5). The chlorine acts a hot chemical cleaning agent. During this hot chlorine cleaning step, the temperature is below the sintering temperature of soot coating 28 so that the space between rod 22 and tube 27 remains open for a sufficient length of time for the required cleaning to occur. The chlorine cleaning step is more effective at high temperatures. It is preferred that the temperature of the cleaning step be at least 1000° C., since at lower temperatures, the duration of the step would be sufficiently long that the step would be undesirable for commercial purposes. Obviously, lower temperatures could be employed if processing time were not a concern. The temperature should not be over 1600° C. for reasons given above and is preferably no more than 1500° C. The flow of hot chlorine between the fluorine tube and rod 22 is very beneficial in that it allows the surfaces of the two members to be brought together without the formation of seeds at their interface. Seeds include defects such as bubbles and impurities that can produce attenuation in the resultant optical fiber. The centerline gas flow 55 continues until tube 36 begins to collapse as shown in FIG. 10.

Figure 6:
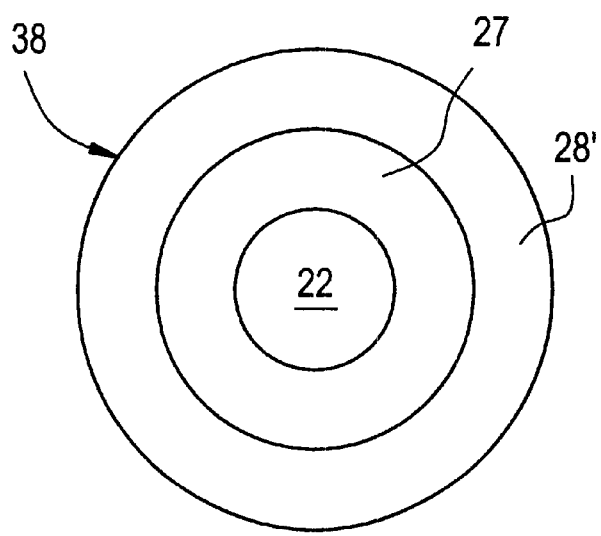
FIG. 6 is a cross-sectional view of the fused assembly resulting from the sintering/fusion step illustrated in FIG. 4.

As soot coating 28 sinters, it exerts a force radially inwardly on tube 27, thereby forcing that tube inwardly against rod 22 to form a fused assembly 38 (see FIG. 6) in which the three regions 22, 27 and 28' are completely fused. A relatively low density soot provides a greater inwardly directed force; however, the soot coating must be sufficiently dense to prevent cracking.

Figure 9:
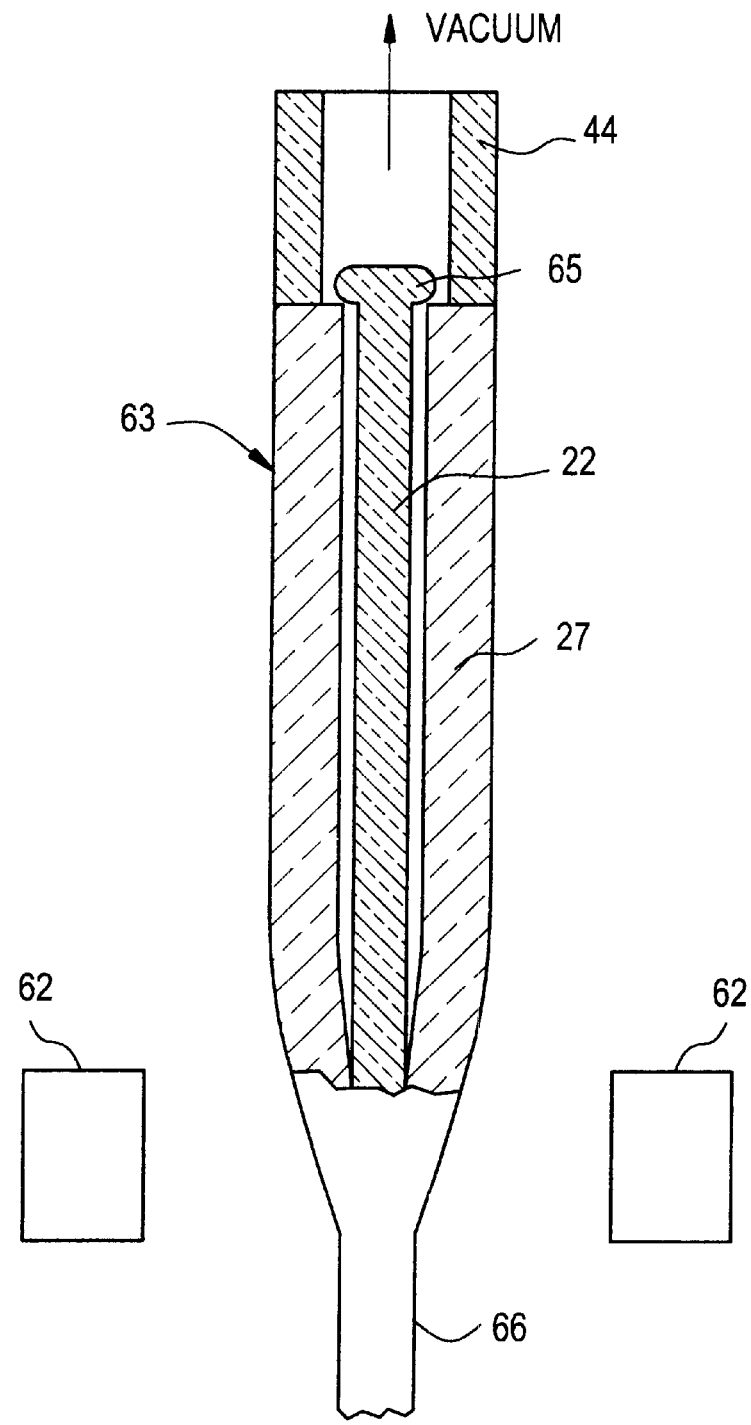
FIG. 9 is a cross-sectional view of a draw furnace in which a tube is stretched and collapsed onto a rod.

It was previously indicated that tube 36 need not be used, whereby other means would be employed for holding rod 22 in tube 27. For example, rod 22 could be suspended by an enlarged end as shown in FIG. 9, or the bottom end of tube 27 could be subjected to a heat treatment and its diameter made sufficiently small to secure rod 22. If tube 22 were not present, the sintering of soot coating 28 would cause the bottom end of tube 27 to collapse onto rod 27 and prevent further flow of centerline gas 55.

Fused assembly 38 can be drawn directly into an optical fiber in which layer 28' forms the outer region. Alternatively, fused assembly 38 can be provided with additional cladding prior to drawing an optical fiber. For example, an additional coating of cladding soot can be deposited onto assembly 38 in the manner shown in FIGS. 1 and 3; the additional coating can be dried and sintered, and the resultant preform can be drawn into an optical fiber.

In accordance with another aspect of the invention soot coating 28 is not deposited on tube 27, and tube 27 is not collapsed onto rod 22 in furnace 15. The assembly including rod 22, tube 27, tube 36 and ball joint handle 44 is subjected to an elevated temperature in a furnace while chlorine flows between rod 22 and tube 27 as discussed above. The temperature preferably remains within the range of about 1000° C. to 1500° C. to chemically clean the surfaces of members 22 and 27. After a sufficient period of time has elapsed to permit chemical cleaning to occur, the cleaned assembly 63 is removed from that furnace and is inserted into a conventional draw furnace (FIG. 9). The top end of rod 22 is provided with an enlarged end 65 which is suspended from a narrow region at or near handle 44. In the illustrated embodiment, the inside diameter of the bottom end of handle 44 is larger than the inside diameter of the top end of tube 27; this provides a ledge for supporting enlargement 65. A source of vacuum (not shown) is connected to handle 44. The bottom tip of assembly 63 is heated by resistance heater 62. As the tip of assembly 63 passes through heater 62, the diameter of the assembly decreases, and tube 27 collapses onto rod 22 and the space between those two members becomes evacuated. Further drawing of assembly 63 causes the assembly to elongate into a core preform rod 66 in which tube 27 is fused to rod 22. The core preform rod is severed into suitable lengths which are provided with cladding and drawn into optical fiber as described above.

Typical step-index optical fibers that were designed for use at wavelengths around 1300 nm exhibit a positive dispersion in the 1550 nm window where the fiber exhibits lowest attenuation. Such a system can be upgraded for operation in the 1550 nm window by placing in series with the step-index fiber a dispersion compensating (DC) fiber having a relatively high value of negative dispersion at 1550 nm. The following example describes the manufacture of such a DC fiber.

A single-mode DC optical fiber having the refractive index profile illustrated in FIG. 7 was made as follows. A 0.25 inch (0.64 mm) alumina rod was inserted through the center an alumina tube having a 1.5 inch (3.8 cm) outside diameter. Rubber corks were used at the ends of the alumina tube to center the alumina rod within it. Handle 11 was placed near one end of the alumina tube. Pure silica soot was deposited on the alumina tube and on a portion of the handle. A detailed description of a method of forming a porous preform on an alumina tube can be found in U.S. Pat. No. 5,180,410.

A standard ball joint handle 14 was fused to the silica handle 11 prior to consolidation. Consolidation was carried out in the manner described in conjunction with FIG. 2. The centerflow gas 16 consisted of 1.5 slpm $SiF_4$. Muffle gas 17 consisted of 20 slpm He, 0.5 slpm $Cl_2$ and 1.0 slpm $SiF_4$.

The sintered fluorine-doped tube contained about 2.4 wt. % fluorine (the $\Delta$-value of the tube with respect to silica was about $-0.7\%\Delta$). The tube was redrawn to form an elongated tube having an outside diameter of approximately 12 mm and an inside diameter of 6.1 mm. A 30 inch (76 cm) long piece of fluorine-doped tubing 27 was severed from the sintered tube. A standard ground joint handle 44 was fused to a first end of tube 27. A 4 inch (10 cm) long silica tube 36 having inside and outside diameters of about 3 mm and 12 mm was fused to the second end of tube 27. The ends of the resultant tubular structure were mounted in a lathe where it was rotated and translated with respect to flame hydrolysis burner 13 (FIG. 3). Particles of $SiO_2$ soot entrained in the burner flame were deposited on tube 27 to build up a coating 28 having a length of 70 cm and a outside diameter of 90 mm. Coating 28 extended over the entire length of tube 27, and it extended a longitudinal distance of about 50 mm along handle 44. The coated structure 30 was then removed from the lathe.

The following method was used to make core rod 22. The large diameter end of an alumina mandrel was inserted into a glass tubular handle. The outside diameter of the mandrel tapered from 5.5 mm to 6.5 mm over its 107 cm length. The ends of the mandrel were mounted in a lathe where it was rotated and translated. $GeO_2$-doped $SiO_2$ soot was deposited on the mandrel and a portion of the handle. The reactants $GeCl_4$ and $SiCl_4$ were initially flowed to the burner in sufficient quantities to form soot formed of $SiO_2$ doped with 37 wt. % $GeO_2$. With each pass of the burner with respect to the mandrel, the flow of $GeCl_4$ was decreased, the last pass depositing pure silica soot. The flow of $GeCl_4$ to the burner decreased in accordance with such a recipe that the radial decrease in the concentration of $GeO_2$ in the resultant fiber was substantially parabolic.

After the deposition of a soot preform to a thickness of 100 mm, the mandrel was removed by pulling it out through the handle, thereby leaving a longitudinal aperture. A capillary tube was inserted into the end of the porous preform aperture opposite the handle. The porous preform was suspended in a consolidation furnace, and a centerline drying gas comprising 1.0 slpm helium and 50 sccm chlorine was flowed through the handle, into the preform aperture, and outwardly through the preform interstices. A muffle gas comprising 40 slpm helium flowed upwardly through the furnace. The maximum temperature of the consolidation furnace was 1460° C. The aperture of the capillary tube plug closed during the sintpring process.

The sintered preform was inserted into a draw apparatus where its tip was heated to 2100° C. while a vacuum connection was affixed to its upper end in the manner disclosed in U.S. Pat. No. 4,486,212, which is incorporated herein by reference. After the end of the preform was stretched so that its aperture was either very narrow or completely closed, the aperture was evacuated. As the lower end of the preform was pulled downwardly at a rate of about 15 cm/min, and its diameter decreased, the evacuated aperture collapsed. The diameter of the resultant rod was approximately 6 mm. The refractive index profile of the resultant stretched rod was similar to that between the axis and radius and $r_1$ of FIG. 7. A rod 22 having a length of 70 cm was severed from the stretched rod. Two slots 23 were sawed at the periphery of that end 24 of rod 22 that was to form the lower end in the subsequent consolidation process.

Rod 22 was inserted through handle 44 and into fluorine-doped tube 27 until end 24 thereof contacted tube 36, thereby forming the soot-coated assembly 32 of FIG. 4. Handle 44 of assembly 32 was suspended from a support tube 46 for insertion into the consolidation furnace. While assembly 32 was rotated at 1 rpm, it was lowered into consolidation furnace muffle 15 at a rate of 5 mm per minute. A gas mixture comprising 50 sccm chlorine and 40 slpm helium flowed upwardly through the muffle. The centerline gas flow 55 consisted of 0.5 slpm chlorine. The chlorine flowed downwardly around rod 22 and exhausted through tube 36. The maximum temperature in the consolidation furnace was 1500° C. As assembly 32 moved downwardly into the furnace, the temperature of assembly became high enough that the centerline chlorine flow cleaned the adjacent surfaces of rod 22 and tube 27. As assembly 32 moved further into the furnace, first its tip and then the remainder of the assembly was subjected to the 1460° C. temperature which was sufficient to sinter coating 28. During sintering of soot coating 28, tube 27 was forced inwardly against section 22, and the contacting surfaces became fused, thereby forming fused assembly 38.

Assembly 38 was removed from the consolidation furnace and was inserted into a draw furnace. The lower end of the preform was heated to about 2100° C., and it was drawn to form a rod having a diameter of 5.5 mm.

A 90 cm section was severed from the resultant rod, and it was supported in a lathe where it functioned as a mandrel for the deposition of an additional coating of cladding glass soot. Deposition was continued in the manner described in conjunction with FIG. 1 until a layer of $SiO_2$ particles having an outside diameter of 100 mm was deposited to form a composite preform.

The resultant composite preform was gradually inserted into a consolidation furnace having a maximum temperature of 1450° where it was sintered while a mixture of 99.5 volume percent helium and 0.5 volume percent chlorine flowed upwardly through the furnace muffle. The resultant sintered draw blank, the diameter of which was about 50 mm, was inserted into a draw furnace where the tip thereof was subjected to a temperature of about 2100° C. The draw blank was drawn to form a dispersion compensating optical fiber having an outside diameter of 125 µm. The single-mode cutoff value of the fiber was 750 nm. At a wavelength of 1550 nm, the attenuation was 0.5 dB/km and dispersion was more negative than −90 psec/km nm. The lowest value of dispersion for fibers made by this method was −105 psec/km nm.

Prior to the present invention, seeds formed at the interface between the fluorine tube and germania rod when those two members were brought together. This process essentially completely eliminates seeds as evidenced by the fact that blanks yielding 50 km of fiber were consistantly drawn with no upsets, i.e. fiber attenuation at 1550 nm was consistantly around 0.5 dB/km.

What is claimed is:

1. A method of making an optical fiber comprising:

forming a tubular porous glass preform having an aperture therethrough;

placing the porous glass preform in a furnace and heating the preform while injecting a fluorine-containing gas into the furnace to form a fluorine doped porous glass tube;

heating the fluorine doped tube to sufficiently consolidate the tube into a consolidated glass fluorine doped tube;

positioning a glass rod within the consolidated fluorine doped glass tube;

collapsing the tube onto the rod to form a core glass preform;

depositing a cladding material on the core glass preform;

sintering the cladding material to form an optical fiber preform; and drawing a fiber from the optical fiber preform, the fiber having a cladding comprising a refractive index at least as high as the refractive index of pure silica, the cladding being adjacent a region of the fiber formed by the fluorine doped tube.

2. The method of claim 1, wherein the glass rod is comprised of a material having a refractive index higher than that of the fluorine doped tube.

3. The method of claim 1, wherein the glass rod is comprised of a material having a refractive index higher than that of pure silica.

4. The method of claim 1, further comprising, prior to said collapsing step, flowing a gas through said tube, said gas comprised of at least 50% chlorine.

5. The method of claim 1, further comprising, prior to said positioning step, drawing said glass tube to have an internal diameter which is narrower than the internal diameter of said tube prior to said drawing step.

6. The method of claim 1, wherein said fluorine doping step comprises doping the tube with an amount of fluorine which is sufficient to give said tube a $\Delta_{a\text{-}b}$-value of less than −0.5% with respect to silica, where $\Delta_{a\text{-}b}=(n_a^2-n_b^2)/(2n_a^2)$, $n_a$ being the refractive index of the fluorine-doped glass and nu being the refractive index of silica.

7. The method of claim 1, wherein said fluorine doping step comprises doping the tube with an amount of fluorine which is sufficient to give said tube a $\Delta_{a\text{-}b}$-value of less than −0.7% with respect to silica, where $\Delta_{a\text{-}b}=(n_a^2-n_b^2)/(2n_a^2)$, $n_a$ being the refractive index of the fluorine-doped glass and nu being the refractive index of silica.

8. The method of claim 1, wherein the glass rod is a rod comprised of silica and an index of refraction increasing dopant.

9. The method of claim 1 wherein the cladding material comprises silica.

10. The method of claim 1 wherein the refractive index of the cladding material is no more than a refractive index of the glass rod.

11. The method of claim 1, further comprising, prior to said depositing a cladding material, reducing the diameter of the core glass preform.

12. The method of claim 1, wherein said fluorine doping step comprises doping the tube with an amount of fluorine which is sufficient to give said tube a Δ-value of less than about −0.5% with respect to the cladding, where $\Delta_{a-b}=(n_a^2-n_b^2)/(2n_a^2)$, $n_a$ being the refractive index of the fluorine-doped glass and $n_b$ being the refractive index of the cladding.

13. The method of claim 1, wherein said fluorine doping step comprises doping the tube with an amount of fluorine which is sufficient to give said tube a Δ-value of less than about −0.7% with respect to the cladding, where $\Delta_{a-b}=(n_a^2-n_b^2)/(2n_a^2)$, $n_a$ being the refractive index of the fluorine-doped glass and $n_b$ being the refractive index of the cladding.

14. The method according to claim 1 wherein the optical fiber has a cladding consisting essentially of pure silica.

15. The method according to claim 1 wherein the optical fiber has a fluorine doped core region and a cladding consisting essentially of pure silica.

16. The method according to claim 1 wherein the optical fiber has a fluorine doped core region and a cladding consisting of silica.

17. The method of claim 1, wherein the glass rod is comprised of a material having a refractive index higher than that of undoped silica.

18. A method of making an optical fiber, comprising the steps of:

forming a consolidated glass rod containing a refractive index increasing dopant, forming a consolidated glass tube containing a refractive index decreasing dopant, inserting the rod into the tube and fusing the rod and tube together to form a consolidated core, depositing cladding comprising silica soot on an outer surface of the consolidated core, sintering the silica soot to form a consolidated optical fiber preform; and drawing an optical fiber from the fiber preform, the fiber having a cladding comprising a refractive index at least as high as the refractive index of pure silica, the cladding being adjacent a region of the fiber formed by the tube having the refractive index decreasing dopant.

19. The method of claim 18 wherein the refractive index decreasing dopant comprises fluorine.

20. The method of claim 19 wherein the tube contains less than about 2.5% by weight of fluorine.

21. The method of claim 19 wherein the fluorine is added to the glass tube by depositing an amount of fluorine which is sufficient to give the tube a Δ-value of less than −0.5% with respect to the cladding, where $\Delta_{a-b}=(n_a^2-n_b^2)/(2n_a^2)$, $n_a$ being the refractive index of the fluorine-doped glass and $n_b$ being the refractive index of the cladding.

22. The method of claim 18, further comprising, prior to said depositing a cladding material, reducing the diameter of the core glass preform.

23. The method of claim 18 wherein the optical fiber has a cladding consisting essentially of pure silica.

24. A method of making an optical fiber, comprising:

forming a glass rod exhibiting a first refractive index and containing a first dopant, forming a silica tube including a second dopant, the tube exhibiting a second refractive index different than the first refractive index, consolidating the glass rod and tube thereby forming a consolidated core, and depositing cladding comprising silica soot on an outer surface of the consolidated core, and drawing the consolidated core having a cladding consisting of silica into an optical fiber, the cladding being adjacent a region of the fiber formed by the tube having the second dopant.

25. The method of claim 24 wherein the second dopant is fluorine.

26. The method of claim 25 wherein the fluorine doping step comprises doping the tube with an amount of fluorine which is sufficient to give the tube a $\Delta_{a-b}$-value of less than −0.5% with respect to the cladding, where $\Delta_{a-b}=(n_a^2-n_b^2)/(2n_a^2)$, $n_a$ being the refractive index of the fluorine-doped glass and $n_b$ being the refractive index of the cladding.

27. The method of claim 25 wherein the fluorine doping step comprises doping the tube with an amount of fluorine which is sufficient to give the tube a $\Delta_{a-b}$-value of less than −0.7% with respect to the cladding, where $\Delta_{a-b}=(n_a^2-n_b^2)/(2n_a^2)$, $n_a$ being the refractive index of the fluorine-doped glass and $n_b$ being the refractive index of the cladding.

28. The method of claim 24 wherein the tube contains less than about 2.5% by weight of fluorine.

29. The method according to claim 24 wherein the fiber further comprises a core having an annular depressed region having a refractive index of less than the refractive index of the cladding of the fiber.

30. A method of making an optical fiber comprising:

forming a tubular porous glass preform having an aperture therethrough;

placing the porous glass preform in a furnace and heating the preform while injecting a fluorine-containing gas into the furnace to form a fluorine doped porous glass tube;

heating the fluorine doped tube to sufficiently consolidate the tube into a consolidated glass fluorine doped tube;

positioning a glass rod within the consolidated fluorine doped glass tube;

collapsing the tube onto the rod to form a core glass preform;

depositing a cladding material on the core glass preform;

sintering the cladding material to form an optical fiber preform; and drawing a fiber from the optical fiber preform, the fiber having a cladding comprising a refractive index at least as high as the refractive index of undoped silica, the cladding being adjacent a region of the fiber formed by the fluorine doped tube.

* * * * *